United States Patent
Mylsamy

(10) Patent No.: US 10,412,608 B2
(45) Date of Patent: Sep. 10, 2019

(54) COMMUNICATION DEVICE AND TESTING METHOD

(71) Applicant: Rohde & Schwarz GmbH & Co. KG, München (DE)

(72) Inventor: RaajaGuru Mylsamy, Singapore (SG)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 26 days.

(21) Appl. No.: 15/414,572

(22) Filed: Jan. 24, 2017

(65) Prior Publication Data

US 2018/0132119 A1   May 10, 2018

(30) Foreign Application Priority Data

Nov. 4, 2016   (EP) .................................. 16197240

(51) Int. Cl.
| | |
|---|---|
| *H04W 24/08* | (2009.01) |
| *H04W 24/06* | (2009.01) |
| *H04L 12/26* | (2006.01) |
| *H04B 17/19* | (2015.01) |
| *G06F 3/0484* | (2013.01) |

(52) U.S. Cl.
CPC ............ *H04W 24/08* (2013.01); *H04L 43/50* (2013.01); *H04W 24/06* (2013.01); *G06F 3/0484* (2013.01); *H04B 17/19* (2015.01)

(58) Field of Classification Search
CPC ...... H04W 24/08; H04W 24/06; H04L 43/30; H04B 17/19; G06F 3/0484
See application file for complete search history.

(56) References Cited

U.S. PATENT DOCUMENTS

| | | | | |
|---|---|---|---|---|
| 7,539,489 | B1* | 5/2009 | Alexander | H04W 24/06 370/241 |
| 2006/0080577 | A1 | 4/2006 | Kim | |
| 2006/0183470 | A1* | 8/2006 | Koivukangas | H04W 24/00 455/423 |
| 2006/0234698 | A1* | 10/2006 | Fok | H04L 43/00 455/425 |
| 2012/0276853 | A1 | 11/2012 | De Ruijter | |
| 2015/0318935 | A1 | 11/2015 | Hudson et al. | |
| 2017/0013121 | A1* | 1/2017 | Baeder | H04M 3/00 |

FOREIGN PATENT DOCUMENTS

TW    201 508 285 A    3/2015

OTHER PUBLICATIONS

Extended European Search Report for European Application No. 16197240.0 (dated Mar. 24, 2017).
Commonly-assigned, co-pending U.S. Appl. No. 15/398,442 for "Method for Testing a Device Under Test, Electronic Device, and Measurement Unit," (Unpublished, filed Jan. 4, 2017).

* cited by examiner

*Primary Examiner* — Jianye Wu
(74) *Attorney, Agent, or Firm* — Shumaker & Sieffert, P.A.

(57) ABSTRACT

A communication device (100, 200, 300) for communication in a wireless network (101, 201, 301) comprises a functional unit (102, 202, 302), which is configured to communicate in the wireless network (101, 201, 301), and a testing unit (104, 204, 304), which is coupled to the functional unit (102, 202, 302) and is configured to controllably exchange test data (105, 205, 305) with the functional unit (102, 202, 302). The present invention further provides a testing method for such a communication device.

18 Claims, 4 Drawing Sheets

COMMUNICATION DEVICE AND TESTING METHOD

PRIORITY CLAIM

This application claims the benefit of European Patent Application No. 16197240.1, filed Nov. 4, 2016; the disclosure of which is incorporated herein by reference in its entirety.

TECHNICAL FIELD

The present invention relates to a communication device. The present invention further relates to a testing method for such a communication device.

BACKGROUND

Although applicable in principal to any system that must be tested after production or during use, the present invention and its underlying problem will be hereinafter described in combination with wireless communication devices.

Testing of mobile devices, like e.g. smartphones or IoT devices (Internet-of-Things) is usually performed during production of the respective device. However, with increasing technological developments and e.g. increasing miniaturization and higher frequencies, testing becomes more and more complex. The respective testing equipment can be very expensive and manufacturers may not be able to invest the necessary amounts.

Against this background, the problem addressed by the present invention is to provide a simple method for testing communication devices.

SUMMARY

The present invention solves this object by a communication device with the features of claim 1, and by a testing method with the features of claim 11.

Accordingly it is provided:

A communication device for communication in a wireless network, the communication device comprising a functional unit, which is configured to communicate in the wireless network, and a testing unit, which is coupled to the functional unit and is configured to controllably exchange test data with the functional unit.

A testing method for a communication device with a functional unit and a testing unit, the method comprising exchanging test data between the functional unit and the testing unit, and evaluating the exchanged test data.

The present invention is based on the finding that dedicated testing hardware is very complex and provides only little flexibility after the testing has been performed.

The present invention therefore implements testing capabilities in the communication device, which at least partially substitute tests with dedicated testing hardware.

The communication device therefore comprises two separate units. A functional unit that performs the normal operation of the device. In e.g. a smartphone the functional unit may be the main processor with the surrounding circuitry and the respective operating system. In an IoT device the functional unit can e.g. be a microprocessor with respective firmware and communication circuitry.

The second unit is the testing unit, which is coupled to the functional unit and can be controlled to exchange test data with the functional unit. The exchange can be a bidirectional exchange, i.e. the functional unit can provide test data to the testing unit or the testing unit can provide test data to the functional unit. This means that the testing unit can e.g. evaluate the test data from the functional unit. On the other hand the testing unit can provide test data to the functional unit and the functional unit can e.g. evaluate the correct reception. The test data can also comprise test messages or generated signals, which can be evaluated. The test data can also comprise any kind of command from the functional unit to the testing unit or vice versa.

Since both units are integrated into the communication device, any communication device can be provided with self-testing capabilities. At least some of the complex test procedures, which are normally performed with dedicated test equipment can therefore be performed in the communication device without additional hardware.

Further embodiments of the present invention are subject of the further subclaims and of the following description, referring to the drawings.

In a possible embodiment, the functional unit can comprise a test controller, which can be configured to control the testing unit to receive test data from the functional unit, or to provide test data to the functional unit, wherein the testing unit or the test controller can be configured to evaluate the test data.

Evaluating in this context refers to testing or verifying any detail or parameter of the test data that is required to identify a fault free or faulty functional unit. Such details or parameters can e.g. refer to the content, the timing, the frequencies, or the amplitudes of the signal.

The test controller can e.g. comprise a hardware component or a software or a combination of hardware and software and can e.g. control the testing in the communication device. The testing unit can also comprise a hardware component or a software or a combination of hardware and software. The testing unit can e.g. receive specific commands from the test controller, which trigger specific test actions in the testing unit or set the testing unit into a specific reception and evaluation state. The test controller can then e.g. trigger the functional unit to emit a specific signal or signal sequence as test signal to the testing unit. An evaluation of the received signal then e.g. allows the testing unit to monitor the signal generation in the functional unit. The testing unit can also be configured to provide the received test data to the test controller, which can then perform the evaluation.

The test controller can e.g. also command the testing unit to provide a specific signal or signal sequence as test signal to the functional unit. An evaluation of the received signal by the test controller then e.g. allows the test controller to monitor the signal reception in the functional unit.

If, as already indicated above, the testing unit forwards the received test data to the test controller, the evaluation logic can be concentrated in the test controller. Such an evaluation logic can e.g. be provided in a software application in the functional unit or the testing unit. This further allows easily updating the software application.

In a possible embodiment, the functional unit can comprise a first RF interface, Radio Frequency interface, for communication with the wireless network, and the testing unit can be coupled to the RF interface. Coupling the testing unit to the RF interface of the functional unit allows the testing unit to evaluate the RF signals that are generated by the functional unit and therefore testing the entire signal generation chain of the functional unit up to the RF port. At the same time this coupling allows the testing unit to generate RF signals, which are then received by the functional unit, and testing the entire signal reception chain of the function unit starting at the RF port.

In a possible embodiment, the testing unit can comprise a dedicated RF interface. The dedicated RF interface of the testing unit allows providing to the functional unit and receiving from the functional unit the testing signals via an over the air RF transmission. Thus not only the internal RF ports of the functional unit can be tested but also the further components of the RF interface, e.g. the antenna, of the functional unit.

In a possible embodiment, the test controller can be configured to generate or to control the testing unit to generate the test data as RF data of a predetermined channel of the wireless network and/or with a predetermined frequency range and/or with a predetermined header and/or with predetermined data and/or in predetermined timeslots and/or with a predetermined encoding. This allows adapting the test data to specific parameters of the wireless network.

In a possible embodiment, the test controller can be configured to control the testing unit to emit test data via the dedicated RF interface and/or receive test data via the dedicated RF interface. This allows the test controller to initiate a test of the communication device as well as another communication devices with the testing unit via the RF interface. In one example the communication device can e.g. be in one communication cell with a plurality of other communication devices that do not comprise the testing unit. However, with the arrangement of the test controller controlling the testing unit any communication device within reach of the RF interface can be tested.

In a possible embodiment, the testing unit can comprise a digital data connection to a digital data output and input of a transceiver of the functional unit. The digital data output and input of the transceiver refers to the connection between the transceiver and further digital processing hardware in the functional unit. The transceiver further comprises the RF port, which is used to output and receive RF signals. This connection allows the testing unit to either receive digital data from or provide digital data to the further digital processing hardware in the functional unit and e.g. testing error correction or error recovery of said unit.

In a possible embodiment, the test controller can comprise a data injection and sniffing interface to a communication protocol stack of the functional unit and can be configured to provide test data to the communication protocol stack of the functional unit and to read digital data from the communication protocol stack of the functional unit. This allows the test controller to interface with any layer of the communication protocol stack and perform in depth testing of the protocol stack by injecting test data and reading the respective results.

The test controller can e.g. perform single layer tests, where the test controller injects data to a specific layer of the communication protocol stack and evaluates the output of the respective layer. Further, the test controller can e.g. perform multi-layer tests, where the test controller injects data to a specific layer of the communication protocol stack and evaluates the respective output of another downstream layer. It is understood that this can be performed in the receiving and the transmission direction.

If the communication device is e.g. a Wireless LAN device, the layers can comprise any layer of the OSI layer model. In an LTE system an exemplary layer model can comprise the RRC layer, the PDCP layer, the RLC layer, the MAC layer and the PHY layer.

In a possible embodiment, the test controller can comprise a first user interface for user interaction, wherein the testing unit can be connected to the first user interface for user interaction or can comprise a second user interface for user interaction. User interaction in this context refers to a user controlling either the test controller or the testing unit or receiving information from the test controller or the testing unit. The user interface can e.g. comprise dedicated push buttons. In addition, the user interface can e.g. comprise a display on a screen of the communication device. Buttons can e.g. also be displayed on a touchscreen device of the communication device.

If the user interfaces are displayed e.g. on a touchscreen device of the communication device, e.g. a smartphone, the user interface of the test controller can be displayed separately of the user interface of the testing unit, e.g. in separate applications. As an alternative, one single application can provide the user interface to both, the test controller and the testing unit.

In a possible embodiment, the testing unit or the test controller can comprise a remote control interface, which can be configured to receive control commands via the wireless network and transmit test data via the wireless network. The remote control interface can be used to initiate tests in the communication device, i.e. the test controller or the testing unit, from e.g. a central test coordinator via the wireless network or e.g. the internet. The results of the test data can then be provided to the central test coordinator.

The test data can also comprise the instruction to the central test coordinator to generate specific test signals and provide the specific test signals to the functional unit e.g. via the wireless network. This also implies that the communication between the testing unit and the central test coordinator can be initiated by the test coordinator or the testing unit.

For communicating with the central test coordinator the test controller or the testing unit can e.g. use the RF interface of the functional unit or the dedicated RF interface.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
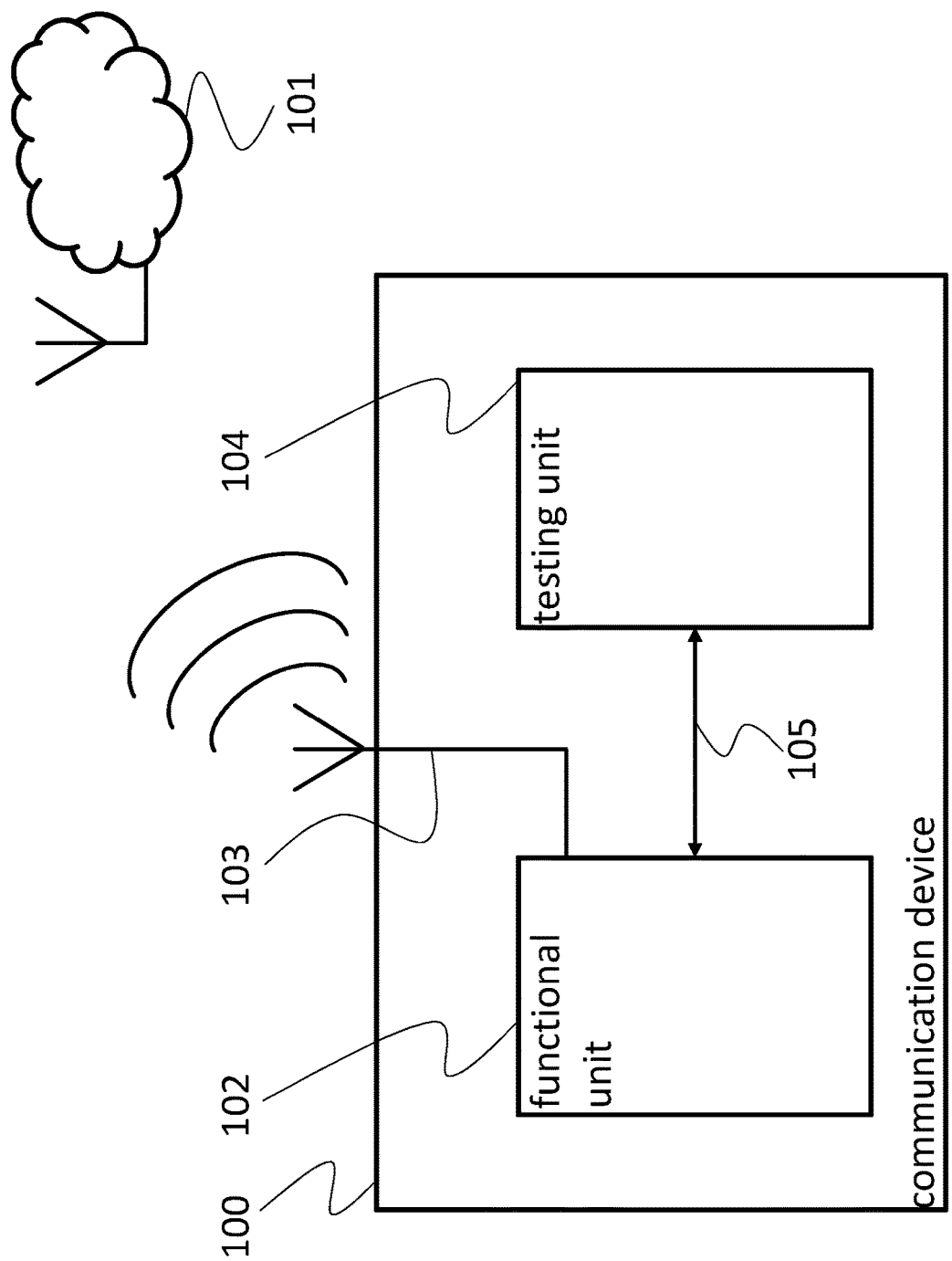
FIG. 1 shows a block diagram of an embodiment of a communication device according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

FIG. 1 shows a block diagram of a communication device 100. The communication device 100 may e.g. be a smartphone, a laptop or an IoT device and communicate with or in the wireless network 101.

The communication device 100 comprises two separate units, the functional unit 102 and the testing unit 104. The functional unit 102 performs all the functions that the communication device 100 needs or provides to other devices or users during normal operation. If e.g. the communication device 100 is a smartphone the functional unit 102 will provide all the functions a normal smartphone has. In an IoT device the normal functions can e.g. comprise measurement and control functions or the like. The functional unit 102 comprises a RF interface 103 that allows the functional unit 102 to communicate in the wireless network 101.

The testing unit 104 is integrated with the functional unit 102 in the communication device 100 and may be used to test the functional unit 102 without additional, e.g. external, test equipment. The testing unit 104 and the functional unit 102 are coupled to each other and can exchange test data 105. As will be shown in FIGS. 2 and 3 the connection between the testing unit 104 and the functional unit 102 can be of different types, e.g. RF connections, digital or analog data connections or the like.

The test data 105 can be any kind of data that is needed to perform the testing of the functional unit 102. Therefore, test data 105 can e.g. comprise commands to the testing unit 104, test signals generated either by the testing unit 104 or the functional unit 102, measurement data from the testing unit 104 or the functional unit 102 or measured test signals or the like.

In communication device 100 testing of the functional unit 102 can e.g. be initiated by a manufacturer of the communication device 100 at an end of line test or after production or by a user or a network operator during normal operation of the communication device 100. The testing unit 104 can e.g. be instructed via the functional unit 102 to initiate a certain test. In addition or as an alternative, an interface (not explicitly shown) to the testing unit 104 can be provided that allows directly communicating with the testing unit 104.

Performing a test of the functional unit 102 can e.g. comprise commanding the testing unit 104 to generate certain test data 105, e.g. RF or digital signals, and provide the test data 105 to the functional unit 102. In addition respective measurement values of the signal reception in the functional unit 102 can then be evaluated in the functional unit 102 or the testing unit 104.

In addition or as an alternative, performing a test of the functional unit 102 can e.g. comprise commanding the functional unit 102 to generate certain test data 105, and receiving the test data 105 or a signal generated based in the test data 105 in the testing unit 104. In addition respective measurement values of the signal reception can then be evaluated in the functional unit 102 or the testing unit 104.

Figure 2:
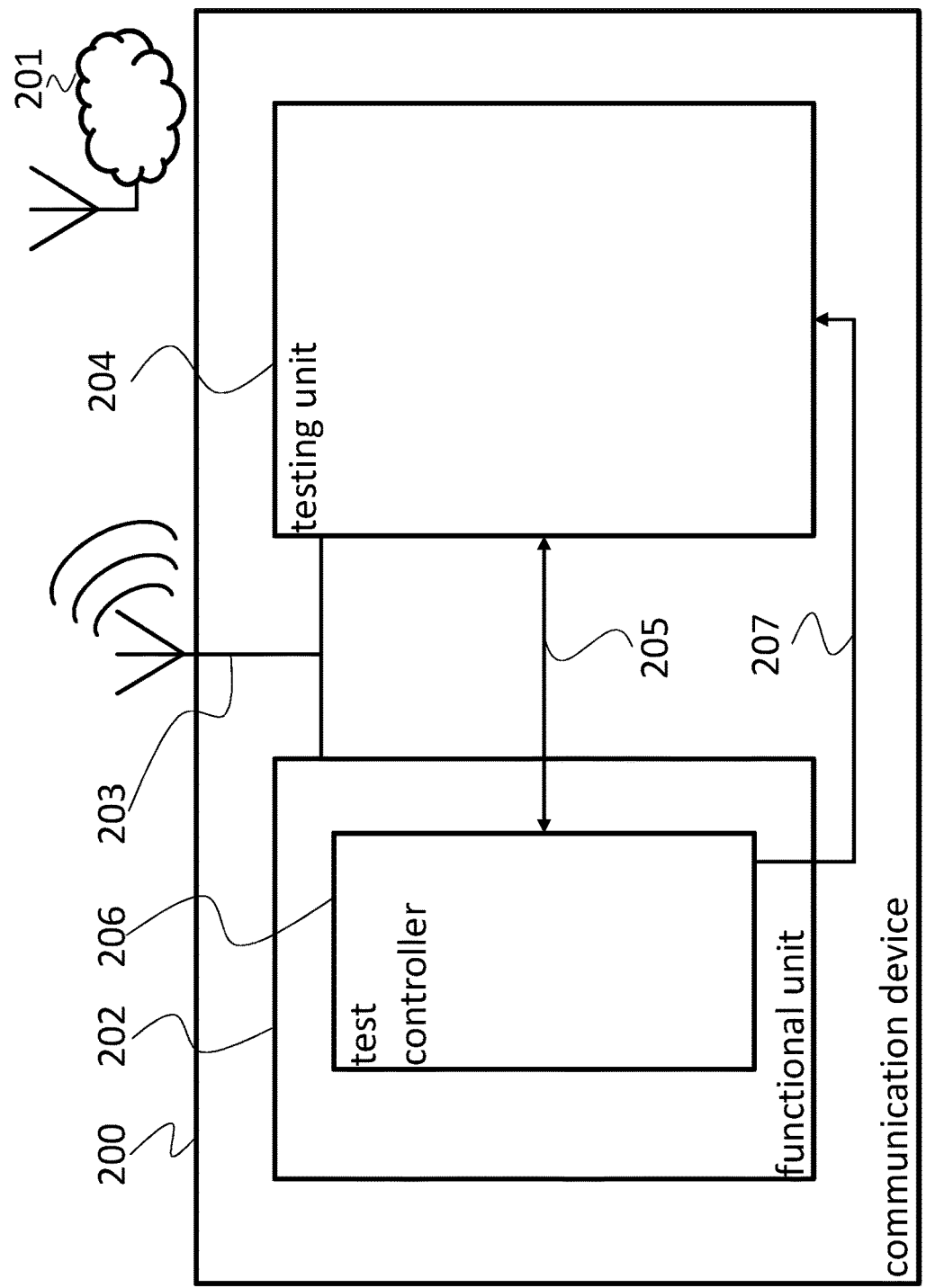
FIG. 2 shows a block diagram of another embodiment of a communication device according to the present invention.

FIG. 2 shows a block diagram of another communication device 200. In the communication device 200 the functional unit 202 comprises a test controller 206. The testing unit 204 is connected to the RF interface 203 of the functional unit 202. That means e.g. that the testing unit 204 can use the RF interface 203 to receive or emit RF signals. The testing unit 204 can also receive test commands 207 from the test controller 206, which trigger the testing unit 205 to perform certain testing functions.

The test controller 206 can e.g. be an application that is executed on a processor (not explicitly shown) of the functional unit 202. The test controller 206 can also be a combination of hardware and software in the functional unit 202 that comprises e.g. a digital data interface to the testing unit 204.

The test controller 206 can e.g. generate the test data 205 as RF signal or as commands, that specify the RF signal or any other test signal. The test controller 206 can e.g. generate the test data 205 for a predetermined channel of the wireless network 201, with a predetermined frequency range, with a predetermined header, with predetermined data, in predetermined timeslots and/or with a predetermined encoding. The generated test data 205 can then e.g. be emitted by the functional unit 202, e.g. to the wireless network 201 or the testing unit 204, or by the testing unit 204 and be evaluated by the testing unit 204 or the test controller 206.

As an alternative the test controller 206 can control the testing unit 204 to generate the test data 205 or signals based on the test data in any one of the above mentioned variations. The test controller 206 can then provide the generated test data 205 to the functional unit 202 either via the RF interface 203 or via a direct connection. The test data 205 is then received in the functional unit 202. The functional unit 202 can then also evaluate the received test data 205.

The testing unit 202 can also be used to test other communication devices than the communication device 200. The testing unit 202 can e.g. be controlled by the test controller 206 to generate respective test data 205 and transmit said test data via the RF interface 203 to such other test devices and receive responses from the other test devices via the RF interface 203.

Evaluating refers to measuring parameters or analyzing contents of the test data 205 or a signal generated based on the test data 205, which allow judging the correct function of the functional unit 202.

Further, the testing unit 204 can also comprise self-testing capabilities to make sure that no errors are detected due to a faulty testing unit 204.

Figure 3:
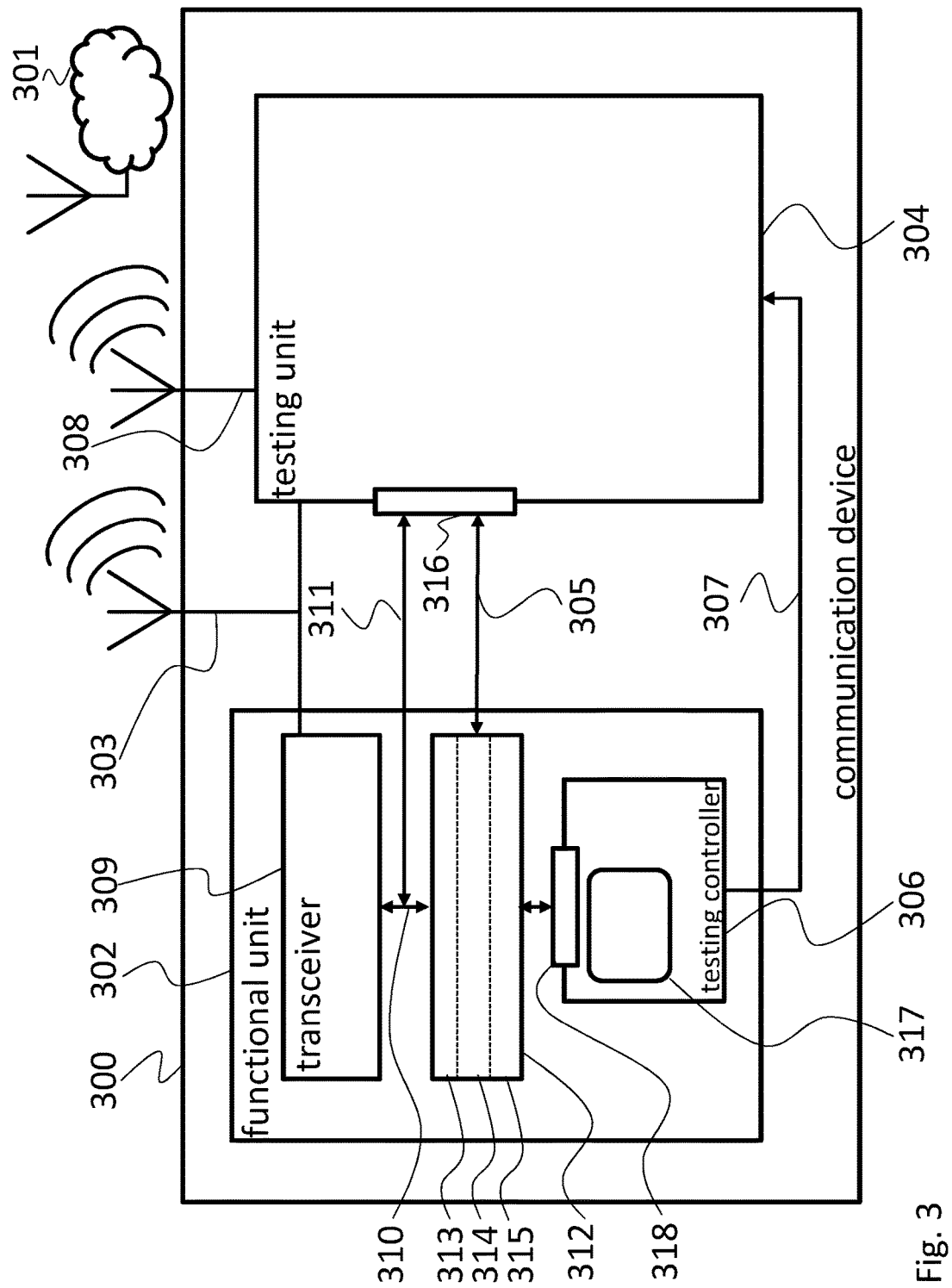
FIG. 3 shows a block diagram of another embodiment of a communication device according to the present invention.

FIG. 3 shows a block diagram of a communication device 300. In the communication device 300 the functional unit 302 comprises a transceiver 309, which comprises a digital data output and input to a communication protocol stack 312. Just exemplarily the communication protocol stack 312 comprises three layers 313, 314 and 315. It is understood that any other number of layers is also possible. In addition the test controller 306 is coupled to the communication protocol stack 312 via a remote control interface 318. This allows e.g. a network provider to communicate via the communication means of the functional unit 302 with the testing controller 306 and control the testing controller 306. This allows the network provider or operator to e.g. provide a central test control server (not explicitly shown) that controls a plurality of communication devices 300 in the wireless network 301 to perform tests in a coordinated fashion. Further, the test results can be collected and centrally managed.

In the communication device 300 the testing unit 304 is coupled to the functional unit 302 via various interfaces. It is understood, that in one embodiment only a selection of these interfaces can be provided as required by the respective application. The testing unit 304 is coupled to the RF interface 303. In addition the testing unit 304 is also coupled to the digital data output and input 310 of the transceiver 309, the communication protocol stack 312, and the test controller 306.

The connections of the testing unit 304 to the digital data output and input 310 and the communication protocol stack 312 is provided via a data injection and sniffing interface 316 of the testing unit 304. The data injection and sniffing interface 316 allows the testing unit 304 to read data from within the communication protocol stack 312, i.e. the different layers 313, 314, 315 and at the digital data interface of the transceiver 309. Further, the data injection and sniffing interface 316 allows the testing unit 304 to inject and/or intercept data at the same points. The data injection and sniffing interface 316 can e.g. be some kind of JTAG (Joint Test Action Group) like interface.

This allows the testing unit 304 to specifically test certain sub-components of the functional unit 302 in detail. The testing unit 304 can e.g. inject test data 305 into a certain layer 313, 314, 315 of the communication protocol stack 312 and then verify the output of said layer 313, 314, 315.

The test controller 306 further comprises a user interface 317, which can be used by a user of the communication device 300 to control the test controller 306. The user interface 317 can also be used to indirectly control the testing unit 304. As an alternative the testing unit 304 can also be provided with a separate user interface.

The user interface 317 can e.g. be a touchscreen of the communication device 300. The user interface 317 can especially be provided by an application that is executed by an operating system of the communication device 300 and displayed on the screen of the communication device 300.

In the above described communication device 300 the testing unit 304 comprises a plurality of interfaces to the functional unit 302. It is understood, that such interfaces can be discrete interfaces, e.g. digital or analog signal lines. Further, such interfaces can also be provided as functions or API, application programming interface, in the operating system of the functional unit 302.

It is understood, that the communication devices shown in FIGS. 1 to 3 are exemplary embodiments and that single features of the shown communication devices can be combined into new embodiments.

Figure 4:
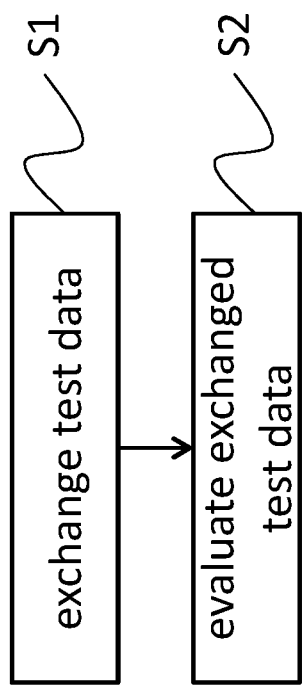
FIG. 4 shows a flow diagram of an embodiment of a testing method according to the present invention.

FIG. 4 shows a flow diagram of an embodiment of a testing method for a communication device 100, 200, 300 with a functional unit 102, 202, 302 and a testing unit 104, 204, 304.

The method comprises exchanging S1 test data 105, 205, 305 between the functional unit 102, 202, 302 and the testing unit 104, 204, 304 internal to the communication device 100, 200, 300, and evaluating S2 the exchanged test data 105, 205, 305 in the communication device 100, 200, 300.

The test data 105, 205, 305 can e.g. be provided from the functional unit 102, 202, 302 to the testing unit 104, 204, 304 or vice versa. Further, the test data 105, 205, 305 can then be evaluated either by the testing unit 104, 204, 304 or a test controller 206, 306 in the functional unit.

When exchanging S1 the test data, the test data 105, 205, 305 can be exchanged via a RF interface 103, 203, 303 of the functional unit 102, 202, 302. Further, the test data 105, 205, 305 can be exchanged via a dedicated RF interface 308 of the testing unit 104, 204, 304. That means that the test data 105, 205, 305 is transmitted from the testing unit 104, 204, 304 via the dedicated RF interface 308 to the RF interface 103, 203, 303 of the functional unit 102, 202, 302 or vice versa.

In that case the test data 105, 205, 305 can be generated in a test controller 206, 306 of the functional unit 102, 202, 302 or the testing unit 104, 204, 304 as RF data of a predetermined channel of a wireless network 101, 201, 301 and/or with a predetermined frequency range and/or with a predetermined header and/or with predetermined data and/or in predetermined timeslots and/or with a predetermined encoding.

In addition or as an alternative the test data 105, 205, 305 can be exchanged between the testing unit 104, 204, 304 and a digital data output and input 310 of a transceiver 309 of the functional unit 102, 202, 302 via a digital data connection 311. As a further alternative or in addition the test data 105, 205, 305 can be provided to or received from a communication protocol stack 312 of the functional unit 102, 202, 302.

The testing method can further comprise interacting in the test controller 206, 306 with a user via a user interface. The testing unit 104, 204, 304 can also be connected to the first user interface 317 or comprises a dedicated user interface for user interaction. In addition, the testing unit 104, 204, 304 or the test controller 206, 306 can be remote controller by receiving control commands via the wireless network 101, 201, 301 and transmitting test data 105, 205, 305 via the wireless network 101, 201, 301.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 communication device
101, 201, 301 wireless network
102, 202, 302 functional unit
103, 203, 303 RF interface
104, 204, 304 testing unit
105, 205, 305 test data
206, 306 test controller
207, 307 test commands
308 RF interface
309 transceiver
310 digital data output
311 digital data connection
312 communication protocol stack
313, 314, 315 layer
316 data injection and sniffing interface
317 first user interface
318 remote control interface

The invention claimed is:

1. A communication device (100, 200, 300) for communication in a wireless network (101, 201, 301), the communication device (100, 200, 300) comprising:
   a functional unit (102, 202, 302), which is configured to communicate in the wireless network (101, 201, 301), and
   a testing unit (104, 204, 304), which is coupled to the functional unit (102, 202, 302) and is configured to controllably exchange test data (105, 205, 305) with the functional unit (102, 202, 302),
   wherein the functional unit (102, 202, 302) comprises a first RF interface (103, 203, 303) for communication with the wireless network (101, 201, 301), and
   the testing unit (104, 204, 304) comprises a second RF interface (308) and the testing unit (104, 204, 304) is con-figured to transmit the test data via the second RF inter-face (308) to the first RF interface (103, 203, 303),
   wherein the functional unit (102, 202, 302) comprises a test controller (206, 306), which is configured to control the testing unit (104, 204, 304) to receive test data (105, 205, 305) from the functional unit (102, 202, 302), or to provide test data (105, 205, 305) to the functional unit (102, 202, 302), wherein the testing unit (104, 204, 304) or the test controller (206, 306) is configured to evaluate the test data (105, 205, 305), and
   wherein the test controller (206, 306) comprises a data injection and sniffing interface (316) to a communication protocol stack (312) of the functional unit (102, 202, 302) and is configured to provide test data (105, 205, 305) to a specific layer of the communication protocol stack (312) of the functional unit (102, 202, 302) and to verify the outputted digital data of the specific layer from the communication protocol stack (312) of the functional unit (102, 202, 302), the communication protocol stack comprising multiple layers.

2. The mobile communication device (100, 200, 300) according to claim 1, wherein the multiple layers of the communication protocol stack comprise any layer of the open systems interconnection (OSI) layer model.

3. The mobile communication device (100, 200, 300) according to claim 1, wherein the test controller (206, 306) is configured to generate or to control the testing unit (104, 204, 304) to generate the test data (105, 205, 305) as RF signal of a predetermined channel of the wireless network (101, 201, 301) and/or with a predetermined frequency range and/or with a predetermined header and/or with predetermined data and/or in predetermined timeslots and/or with a predetermined encoding.

4. The mobile communication device (100, 200, 300) according to claim 1, wherein the test controller (206, 306) is configured to control the testing unit (104, 204, 304) to emit test data (105, 205, 305) via the dedicated RF interface (308) and/or receive test data (105, 205, 305) via the dedicated RF interface (308).

5. The mobile communication device (100, 200, 300) according to claim 1, wherein the testing unit (104, 204, 304) comprises a digital data connection (311) to a digital data output and input (310) of a transceiver (309) of the functional unit (102, 202, 302).

6. The mobile communication device (100, 200, 300) according to claim 2, wherein the multiple layers of the communication protocol stack comprise any layers of the long term evolution (LTE) system model.

7. The mobile communication device (100, 200, 300) according to claim 1, wherein the test controller (206, 306) comprises a first user interface (317) for user interaction, and
   wherein the testing unit (104, 204, 304) is connected to the first user interface (317) for user interaction or comprises a second user interface for user interaction.

8. The mobile communication device (100, 200, 300) according to claim 1, wherein the testing unit (104, 204, 304) or the test controller (206, 306) comprises a remote control interface (318), which is configured to receive control commands via the wireless network (101, 201, 301) and transmit test data (105, 205, 305) via the wireless network (101, 201, 301).

9. The mobile communication device (100, 200, 300) according to claim 2, wherein the multiple layers of the communication protocol stack comprise any layer selected from the group comprising: radio resource control (RRC) layer, the packet data convergence control (PDCP) layer, the radio link control (RLC) layer, the medium access (MAC) layer and the physical (PHY) layer.

10. A testing method for a mobile communication device (100, 200, 300) with a functional unit (102, 202, 302) comprising a first RF interface (103, 203, 303) and a testing unit (104, 204, 304), the method comprising:
    exchanging test data (105, 205, 305) between the functional unit (102, 202, 302) and the testing unit (104, 204, 304) in the mobile communication device (100, 200, 300) by transmitting the test data via a second RF interface (308) of the testing unit (104, 204, 304) to the first RF interface (103, 203, 303), and
    wherein exchanging test data comprises providing test data (105, 205, 305) to a specific layer of the communication protocol stack of the functional unit and verifying the outputted digital data of the specific layer from the communication protocol stack (312) of the functional unit (102, 202, 302) in the communication device (100, 200, 300), the communication protocol stack comprising multiple layers.

11. The testing method according to claim 10, comprising at least one of:
    controlling the testing unit (104, 204, 304) to receive test data (105, 205, 305) from the functional unit (102, 202, 302), or to provide test data (105, 205, 305) to the functional unit (102, 202, 302), wherein the testing unit (104, 204, 304) or a test controller (206, 306) in the functional unit (102, 202, 302) evaluates the test data (105, 205, 305); or controlling the testing unit (104, 204, 304) to emit test data (105, 205, 305) via the second RF interface (308) and/or receive test data (105, 205, 305) via the second RF interface (308).

12. The testing method according to claim 11, comprising in the test controller (206, 306) of the functional unit (102, 202, 302) or the testing unit (104, 204, 304) generates the test data (105, 205, 305) as RF data of a predetermined channel of a wireless network (101, 201, 301) and/or with a predetermined frequency range and/or with a predetermined header and/or with predetermined data and/or in predetermined timeslots and/or with a predetermined encoding.

13. The testing method according to claim 10, comprising exchanging test data (105, 205, 305) between the testing unit (104, 204, 304) and a digital data output and input (310) of a transceiver (309) of the functional unit (102, 202, 302) via a digital data connection (311).

14. The testing method according to claim 11, comprising interacting in the test controller (206, 306) with a user via a user interface, wherein the testing unit (104, 204, 304) is connected to the first user interface (317) or comprises a second user interface for user interaction; and/or comprising remote controlling the testing unit (104, 204, 304) or the test controller (206, 306) by receiving control commands via the wireless network (101, 201, 301) and transmitting test data (105, 205, 305) via the wireless network (101, 201, 301).

15. The testing method according to claim 10, wherein the specific layer from the communication protocol stack comprises any layer of the open systems interconnection (OSI) layer model.

16. The testing method according to claim 10, wherein the specific layer from the communication protocol stack comprise any layers of the long term evolution (LTE) system model.

17. The testing method according to claim 10, wherein the specific layer from the communication protocol stack comprises any layer selected from the group comprising: the radio resource control (RRC) layer, the packet data convergence control (PDCP) layer, the radio link control (RLC) layer, the medium access (MAC) layer and the physical (PHY) layer.

18. The testing method according to claim 10, wherein exchanging test data comprises providing test data to a first layer of the communication protocol stack and verifying the outputted digital data of a second layer of the communication protocol stack, wherein the second layer is different from the first layer.

* * * * *